United States Patent [19]
Nakamura

[11] Patent Number: 5,509,797
[45] Date of Patent: Apr. 23, 1996

[54] INJECTION APPARATUS POSSESSING PRESSURE HOLDING DEVICE

[75] Inventor: Nobuyuki Nakamura, Nagano, Japan

[73] Assignee: Nissei Plastic Industrial Co., Ltd., Nagano, Japan

[21] Appl. No.: 312,462

[22] Filed: Sep. 26, 1994

[30] Foreign Application Priority Data

Sep. 30, 1993 [JP] Japan .................................. 5-268443
May 31, 1994 [JP] Japan .................................. 6-139675

[51] Int. Cl.⁶ .................................................. B29C 45/02
[52] U.S. Cl. .......................... 425/557; 425/561; 425/562; 425/564
[58] Field of Search .................................. 425/557, 558, 425/559, 560, 561, 562, 563, 564

[56] References Cited

U.S. PATENT DOCUMENTS 5,071,341  12/1991  Poehlsen .................................. 425/557

FOREIGN PATENT DOCUMENTS 4113034   2/1960   Japan .
418838    4/1992   Japan .
865403    4/1961   United Kingdom .................... 425/557
2073645  10/1981   United Kingdom .................... 425/559

*Primary Examiner*—Tim Heitbrink
*Attorney, Agent, or Firm*—Weingarten, Schurgin, Gagnebin & Hayes

[57] ABSTRACT

An injection apparatus having a pressure holding device of a novel constitution, capable of preventing flow-out and decrease of resin when holding pressure, and eliminating instability in pressure holding due to volume changes, by forming the front end of the pressure holding plunger obliquely disposed between front and rear resin paths or penetrating a passage between the resin paths.

2 Claims, 2 Drawing Sheets

5,509,797

INJECTION APPARATUS POSSESSING PRESSURE HOLDING DEVICE

BACKGROUND OF THE INVENTION

1. Field of the Invention

The present invention relates to an injection apparatus possessing a pressure holding device in a rear part of a nozzle of an injection cylinder.

2. Background Art

The Japanese Patent Publication No. SHO. 41-13034 discloses an injection apparatus comprising a pressure holding device consisting of a pressure holding plunger, a piston and a hydraulic cylinder on an extended line of a resin path in a bent portion, by bending the resin path between the screw accommodating part of injection cylinder and nozzle part at front end, for holding the pressure by pushing the fused resin by the plunger, using the resin path of the bent portion as pressure holding chamber.

In this conventional apparatus, since the top of the resin path bent by the front end of the pressure holding plunger is formed, the fused resin is likely to stay at the top to cause deterioration, and by pressing by the pressure holding plunger, the fused resin in the pressure holding chamber in the portion confronting the resin path of the screw accommodating part side flows back into the screw accommodating part until the resin path is closed by the pressure holding plunger, and the pressure is not held in this period, and volume change also occurs, and therefore control of holding pressure becomes unstable.

SUMMARY OF THE INVENTION

The invention is hence devised to solve the conventional problems, and it is an object thereof to present an injection apparatus possessing pressure holding device of a novel constitution, capable of preventing flow-out and the decrease of resin when holding pressure, and eliminating instability in pressure holding due to volume changes is presented. The front end of the pressure holding plunger is obliquely disposed between front and rear resin paths such that in one position the plunger allows the rear resin path to communication with a front resin path, and in the alternate position the rear resin path is separated from the front resin path.

To achieve the object, the invention presents an injection apparatus having a pressure holding device characterized by intersecting and forming an oblique path having a larger diameter than the resin paths between a screw accommodating part of an injection cylinder and a nozzle part, disposing a pressure holding device consisting of a pressure holding plunger, a piston, and a hydraulic cylinder having the front end capable of intersecting the resin paths between the front and rear resin paths, using the front part of the intersecting portion of the plunger and the front resin path as a pressure holding chamber, rotatably accommodating the pressure holding plunger, and disposing a plunger turning device on the pressure holding device.

In this embodiment, when the pressure holding plunger is rotated by 180 degrees by a rotating device, the rear resin path is completely separated from the front resin path by the pressure holding plunger.

Next, when the rotation of the pressure holding plunger is stopped and the piston is pressed by the hydraulic cylinder, the pressing force is transmitted to the pressure holding plunger, and the pressure holding plunger presses the fused resin of the pressure holding chamber. As a result, the pressure of the injection filled resin is maintained. Accordingly, in this invention, flow-out and decrease of fused resin in the pressure holding chamber can be prevented when starting to hold pressure, without using an additional valve for closure.

By the rotation of the pressure holding plunger, if the rear resin path is closed, only the volume of the pressure holding chamber is not changed. Hence the resin amount does not increase or decrease depending on volume fluctuations, so that the pressure control can be effected at high precision. Filling and compression can be done as required, and moreover, since the front end surface of the pressure holding plunger is positioned on the path wall surface of the rear resin path and the rear wall of the pressure holding chamber deterioration of resin due to retention can be prevented.

Still more, opening and closing and pressure holding of the rear resin path can be effected only by installing a rotating device in the member for adding a pressing force to the pressure holding plunger, the structure is simpler than the case of disposing a counterflow preventive valve in the rear resin path and installing its rotating device in the injection apparatus, and hence a series of processes of closing and pressure holding can be done promptly by continuous operation of the pressure holding plunger.

In another implementation, a passage through the pressure holding plunger allows communication between the front and rear resin paths in one position, and isolates the front and rear resin paths in another position. In this instance, since the front and rear resin paths communicate with each other through the passage within the pressure holding plunger, the resin paths can be formed in line with each other. Therefore, the flow resistance of the fused resin in the resin path is reduced from the case of the bent resin path, and injection is done smoothly, and the resin path can be cleaned easily when changing materials or the like.

DETAILED DESCRIPTION OF THE PREFERRED EMBODIMENTS

Figure 1:
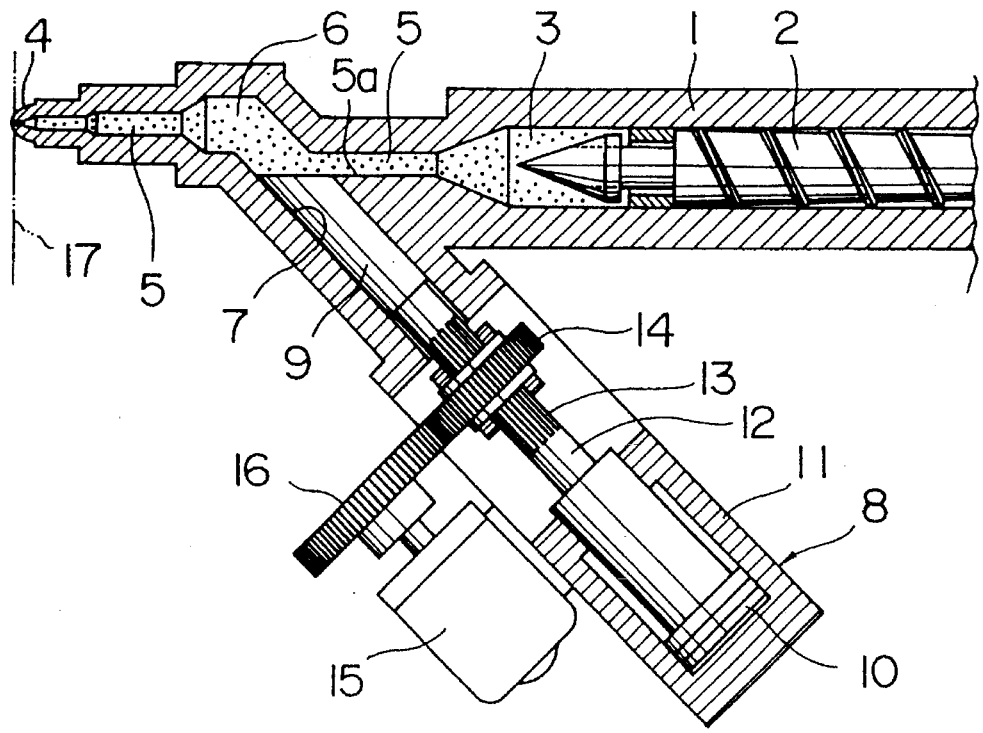
FIG. 1 is a sectional view of an injection apparatus having a pressure holding device in a certain embodiment of the invention.
Figure 2:
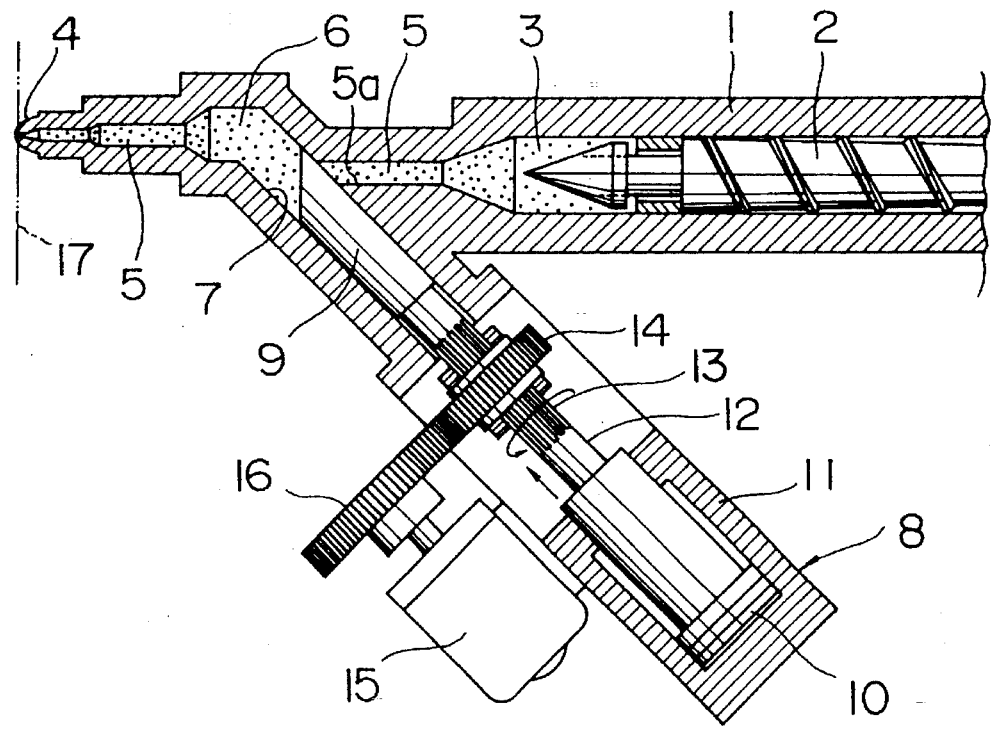
FIG. 2 is a sectional view when the resin path is closed in the same embodiment.

FIG. 1 and FIG. 2 relate to a first embodiment of the invention, in which reference numeral 1 denotes an injection cylinder having an injection screw 2 accommodated in a manner free to rotate and move forward and backward, and a resin path 5 is provided from the front end of screw accommodating chamber 3 to a pressure holding chamber 6.

Reference numeral 6 is a pressure holding chamber formed in the resin path 5, in which an oblique path 7 larger in diameter than the resin path 5 is formed to intersect the resin path 5. As a result, the resin path 5 is divided into the front resin path connected to the nozzle part 4, and the rear resin path connected to the screw accommodating chamber 3.

Reference numeral 8 denotes a pressure holding device, which is disposed on an extension of the oblique path 7. The pressure holding device 8 comprises a pressure holding plunger 9 rotatably accommodated in the oblique path 7, a piston 10 for controlling the held pressure, a hydraulic cylinder 11, and the pressure holding plunger 9 and piston 10 are coupled through a rotary shaft 12.

On the outer circumference of the rotary shaft 12, a spline 13 of specified length is provided, and a gear 14 is mounted on the shaft circumference, being engaged with the spline 13. The gear 14 is also engaged with a gear 16 of a motor 15 mounted at the side of the holding device 8, and the pressure holding plunger 9 is rotated together with the piston 10 by the motor 15.

The front end of the pressure holding plunger 9 is formed obliquely parallel to the resin path 5, and its front end surface is positioned flush with the path wall surface 5a of the rear resin path 5, and is accommodated in the rear oblique path 7 of the pressure holding chamber 6. In such a manner, by the rotation of the pressure holding plunger 9, the front end surface is changed from the horizontal plane shown in FIG. 1 to the vertical plane, and only by rotating the pressure holding plunger 9 by 180 degrees, the rear resin path 5 of the screw accommodating side can be closed completely.

Pressure holding by the pressure holding device 8 is conducted in the following sequence. First, by rotation of the injection screw 2, the fused resin accumulated in the front part of the screw accommodating chamber 3 is injected to fill up a die 17 from the nozzle part 4 by forward move of the injection screw 2.

After completion of injection filling, the pressure holding plunger 9 is rotated by 180 degrees by a motor 15 through gears 16, 14 and rotary shaft. As a result, the direction of the obliquely formed front end surface of the pressure holding plunger 9 is changed, and the opening of the rear resin path 5 is completely closed by the front end side surface of the pressure holding plunger 9.

Consequently, by stopping the rotation of the pressure holding plunger 9, when the piston 10 is pressed by the hydraulic cylinder 11, the pressing force is transmitted to the pressure holding plunger 9 through the rotary shaft 12, and the pressure holding plunger 9 presses the fused resin in the pressure holding chamber 6. As a result, the pressure of the resin injecting to fill up the die 17 is maintained.

After closure of the resin path, at the injection apparatus side, the injection screw 2 is rotated, and weighing of resin is started, and the process is advanced to preparation for next injection filling. After pressure holding and weighing, when the pressure holding plunger 9 is further rotated 180 degrees or rotated reversely by the motor 15 to return to the home position, and direction of the front end surface is changed oppositely to the horizontal direction, and the rear resin path 5 is opened again, and thereby the front and rear resin paths 5 communicate with each other through the pressure holding chamber 6.

Figure 3:
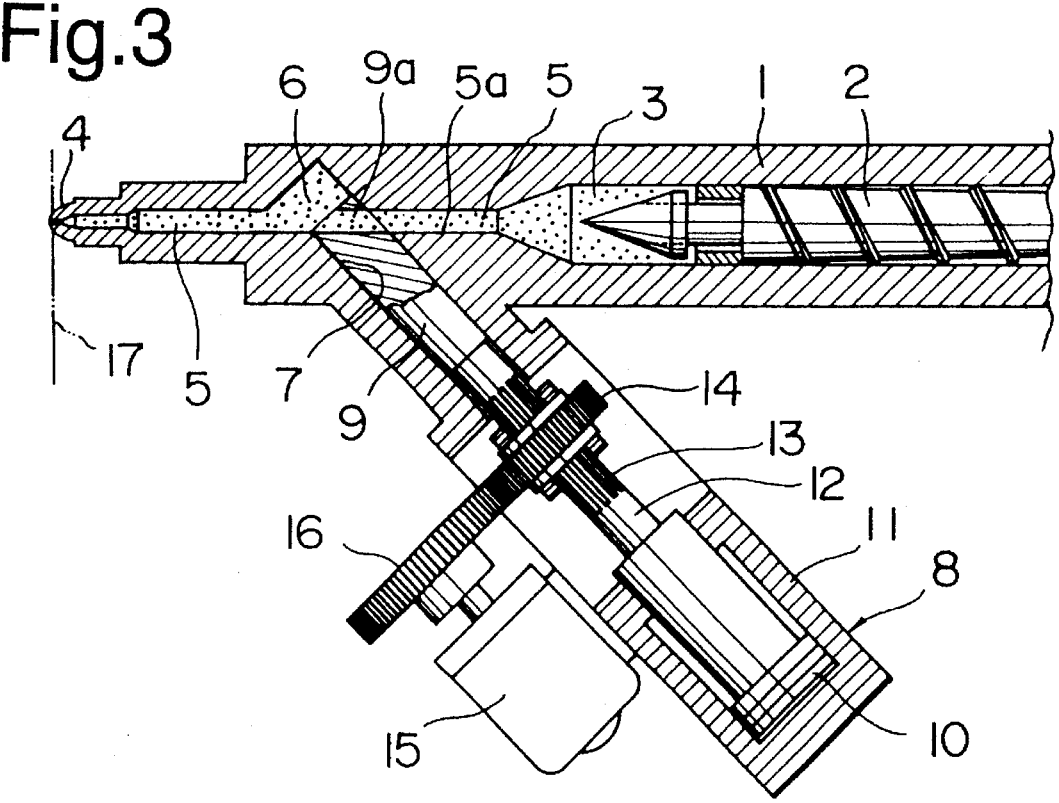
FIG. 3 is a sectional view of another embodiment of the invention.
Figure 4:
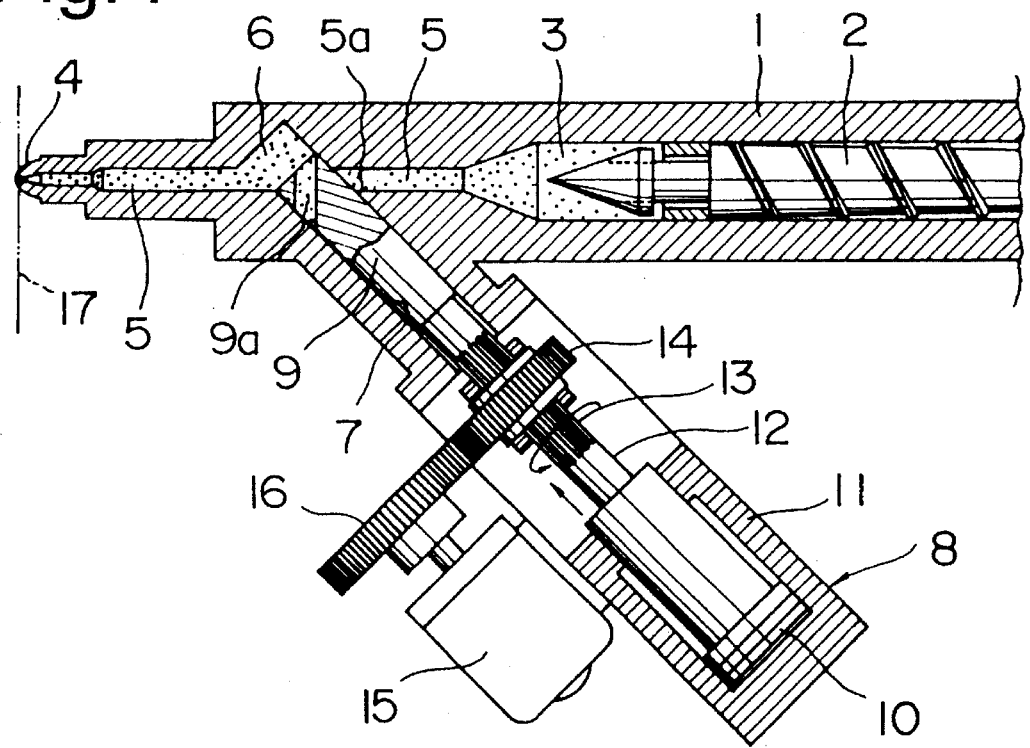
FIG. 4 is a sectional view when the resin path is closed in the same embodiment as depicted in FIG. 3.

FIG. 3 and FIG. 4 relate to a second embodiment and what differs from the above embodiment is the constitution of the front end part of the pressure holding plunger 9 and the resin path 5. The resin path 5 between the screw accommodating part 3 and the nozzle part 4 in this embodiment is formed in both front and rear portions, and a passage 9a parallel to resin path 5 is provided in pressure holding plunger 9. Such pressure holding plunger 9 is flush with the path wall surface 5a of the rear resin path in the path surface of the passage 9a, and is accommodated with the oblique path 7 behind the pressure holding chamber 6.

In such an embodiment, by rotation of the pressure holding plunger 9, the passage 9a positioned between front and rear resin paths is dislocated from the lateral position shown in FIG. 3 to the longitudinal position shown in FIG. 4, and therefore only by rotating the pressure holding plunger 9 by 180 degrees, can rear resin path of the screw accommodating chamber side be closed completely.

Pressure holding by the pressure holding device can be done in the same procedure as in the above embodiment. First, by rotation of the injection screw 2, the fused resin accumulated in the front part of the screw accommodating chamber 3 is injected from the nozzle part 5 to fill up the die 17 by the longitudinal move of the injection screw 2, then pressure holding plunger 9 is rotated 180 degrees by the motor 15 through gears 16, 14 and rotary shaft. As a result, the penetrating passage 9a is rotated, and the opening of the rear resin path 5 is closed completely by a side surface of the pressure holding plunger 9.

Consequently, stopping rotation of the pressure holding plunger 9, when the piston 10 is pressed by the hydraulic cylinder 11, its pressing force is transmitted to the pressure holding plunger 9 through the rotary shaft 12, and the pressure holding plunger 9 advances to press the fused resin in the pressure holding chamber 6 communicating with the front resin path 5 by the flat front end. As a result, the pressure of the resin injecting to fill up the die 17 is maintained.

When the pressure holding plunger 9 is rotated by 180 degrees in either direction to return to the original position, the direction of the passage 9a is positioned again between the front and rear resin paths and the front and rear resin paths communicate with each other through passage 9a.

In this embodiment, the rotary device is installed between the pressure holding plunger 9 and piston 10, but the rotary device may be also provided in the rear part of the hydraulic cylinder 11. In this case, projecting outward from the rear part of the hydraulic is the rotary shaft having a spline in the piston rear end, and the motor is connected to the spline part of the rotary shaft either directly or through a transmission mechanism. In the illustrated example, the rotary force is transmitted through gears, but a toothed belt mechanism may also be employed for transmission.

What is claimed is:

1. An injection apparatus, comprising:

an injection cylinder having a first end and a second end;

an injection screw disposed at said second end of said injection cylinder;

a rear resin path having a first end and a second end, said rear resin path disposed within said injection cylinder and said second end of said rear resin path communicating with said injection screw;

a front resin path having a first end and a second end, said front resin path disposed within said injection cylinder and said second end of said front resin path communicating with a first end of said rear resin path;

a nozzle at said first end of said injection cylinder and communicating with said first end of said front resin path; and a pressure holding device disposed between said second end of said front resin path and said first end of said rear resin path, wherein said pressure holding device comprises:

a rotatable pressure holding plunger, a piston connected to said pressure holding plunger, and a hydraulic cylinder communicating with said plunger, wherein said pressure holding plunger is rotatable to a first position, said first position allowing said front resin path to communicate with said rear resin path, wherein said pressure holding plunger is rotatable to a second position, said second position isolating said front resin path from said rear resin path, and wherein said pressure holding plunger is advanceable to a third position, said third position emptying said front resin path.

2. An injection apparatus, comprising:

an injection cylinder having a first end and a second end;

an injection screw disposed at said second end of said injection cylinder;

a rear resin path having a first end and a second end, said rear resin path disposed within said injection cylinder and said second end of said rear resin path communicating with said injection screw;

a front resin path having a first end and a second end, said front resin path disposed within said injection cylinder and said second end of said front resin path communicating with a first end of said rear resin path;

a nozzle at said first end of said injection cylinder and communicating with said first end of said front resin path; and a pressure holding device disposed between said second end of said front resin path and said first end of said rear resin path, wherein said pressure holding device comprises:

a rotatable pressure holding plunger having a passage extending through said pressure holding plunger, a piston connected to said pressure holding plunger, and a hydraulic cylinder communicating with said plunger, wherein said pressure holding plunger is rotatable to a first position, said first position allowing said front resin path to communicate with said rear resin path, wherein said pressure holding plunger is rotatable to a second position, said second position isolating said front resin path from said rear resin path, and wherein said pressure holding plunger is advanceable to a third position, said third position emptying said front resin path.

* * * * *